United States Patent
Stroh et al.

(10) Patent No.: US 10,508,614 B2
(45) Date of Patent: Dec. 17, 2019

(54) ARBITRATION STRATEGY FOR SLOW RESPONSE AND FAST RESPONSE TORQUE REQUESTS

(71) Applicant: Cummins IP, Inc., Columbus, IN (US)

(72) Inventors: David J. Stroh, Columbus, IN (US); Zachary Schwab, Columbus, IN (US); Govindarajan Kothandaraman, Columbus, IN (US); Robert J. Thomas, Indianapolis, IN (US); Richard S. Fox, Columbus, IN (US); Craig M. Calmer, Columbus, IN (US); Rohit Zope, Columbus, IN (US)

(73) Assignee: Cummins IP, Inc., Columbus, IN (US)

( * ) Notice: Subject to any disclaimer, the term of this patent is extended or adjusted under 35 U.S.C. 154(b) by 761 days.

(21) Appl. No.: 13/910,835

(22) Filed: Jun. 5, 2013

(65) Prior Publication Data
US 2013/0319369 A1 Dec. 5, 2013

Related U.S. Application Data

(60) Provisional application No. 61/655,813, filed on Jun. 5, 2012.

(51) Int. Cl.
*F02D 45/00* (2006.01)
*F02P 5/15* (2006.01)
(Continued)

(52) U.S. Cl.
CPC ........... *F02D 45/00* (2013.01); *F02D 11/105* (2013.01); *F02D 37/02* (2013.01); *F02P 5/1504* (2013.01);
(Continued)

(58) Field of Classification Search
CPC ........... F02D 11/105; F02D 2200/1006; F02D 2250/21; F02D 37/02; F02D 41/0002; F02D 45/00; F02P 5/1504; Y02T 10/46
(Continued)

(56) References Cited

U.S. PATENT DOCUMENTS

| 6,770,009 B2 | 8/2004 | Badillo et al. |
| 2004/0112336 A1* | 6/2004 | Badillo ................. F02D 41/045 123/406.51 |

(Continued)

FOREIGN PATENT DOCUMENTS

| RU | 2264549 | 11/2005 |
| RU | 2267631 | 1/2006 |
| WO | WO-01/44642 | 6/2001 |

OTHER PUBLICATIONS

International Search Report for PCT Application No. PCT/US2013/044347 dated Sep. 19, 2013, 2 pages.
(Continued)

*Primary Examiner* — Xiao En Mo
(74) *Attorney, Agent, or Firm* — Foley & Lardner LLP

(57) ABSTRACT

The present disclosure relates to a system for managing engine output that includes a machine manager module and a combustion module. In one embodiment, the combustion module includes a slow response pathway and a fast response pathway. The slow response pathway includes managing air and fuel actuators and the fast response pathway includes managing spark timing. According to one embodiment, managing spark timing comprises bringing a spark actuator to the middle of a spark timing range for bi-directional control and involves sacrificing engine efficiency for engine responsiveness. Further, the fast response pathway may be selectively enabled based upon an optimization index.

16 Claims, 4 Drawing Sheets

(51) Int. Cl.
*F02D 11/10* (2006.01)
*F02D 37/02* (2006.01)
*F02D 41/00* (2006.01)

(52) U.S. Cl.
CPC .. *F02D 41/0002* (2013.01); *F02D 2200/1006* (2013.01); *F02D 2250/21* (2013.01); *Y02T 10/46* (2013.01)

(58) Field of Classification Search
USPC .... 123/319, 406.22, 406.51, 406.12, 406.23; 701/103, 105, 84
See application file for complete search history.

(56) References Cited

U.S. PATENT DOCUMENTS

| | | | | |
|---|---|---|---|---|
| 2009/0024263 | A1* | 1/2009 | Simon, Jr. | B60K 6/485 701/22 |
| 2011/0253100 | A1* | 10/2011 | Kaiser | F02D 41/0085 123/406.24 |
| 2011/0270509 | A1* | 11/2011 | Whitney | F02D 13/0219 701/103 |
| 2013/0319369 | A1* | 12/2013 | Stroh | F02D 45/00 123/319 |
| 2015/0167567 | A1* | 6/2015 | Stroh | F02D 41/0002 701/103 |

OTHER PUBLICATIONS

First Office Action for Chinese Patent App. No. 201380029401.3 and English language translation; dated Jun. 3, 2016, 14 pages.

* cited by examiner

ARBITRATION STRATEGY FOR SLOW RESPONSE AND FAST RESPONSE TORQUE REQUESTS

CROSS-REFERENCE TO RELATED APPLICATION

This application claims the benefit of U.S. Provisional Patent Application No. 61/655,813, filed on Jun. 5, 2012, which is incorporated herein by reference.

FIELD

The present disclosure relates to engine control systems and more particularly relates to managing multiple torque requestors.

BACKGROUND

Internal combustion engines generate power necessary to accelerate and power vehicles. Generally, an oxidant (e.g., air) and a fuel (e.g., gasoline, diesel, natural gas, etc.) are combined in an engine cylinder and are ignited to generate the power necessary to drive the vehicle. Some gasoline powered engines require a substantially stoichiometric oxidant to fuel ratio in order to initiate the combustion reaction. Once initiated (e.g., spark ignited), the exothermic combustion reaction causes the temperature and pressure within the cylinder to increase, expanding the volume of the cylinder by thrusting the piston outward, thereby driving the crank shaft and powering the vehicle. One characteristic of an internal combustion engine is the torque rating of the engine, which relates to the engine's ability to accelerate and propel the vehicle.

Because the desired speed and acceleration of a vehicle are constantly changing, internal combustion engines are governed by control systems tuned to increase and decrease the torque production of the engine. In spark-ignited gasoline engines, conventional methods and strategies for controlling torque involve control loops that compare the desired engine torque with the actual torque output of the engine, and manipulate the air flow into the combustion chamber to reconcile the difference between desired torque and actual torque. For example, when a user presses the gas pedal to accelerate a vehicle or to manage conditions that the automobile may experience during travel, such as wind resistance, varying road conditions, varying weather conditions, road grade, size and weight of the automobile's cargo, etc., conventional control systems manipulate the injection of gasoline and the intake flow of air to the combustion chamber, thereby promoting or hindering the combustion process to respectively increase or decrease the amount of torque generated by the engine.

However, these conventional air control systems are often too slow and do not provide adequately fast response times for some torque requests. For example, some torque requests may be from secondary engine/car systems, such as anti-lock brake systems (ABS), traction control system (TCS), shift torque management (STM), etc., that limit the torque produced by the engine. For secondary engine systems to be effective, their torque requests must be effectuated in a timely manner. Generally, air intake systems cannot respond fast enough to the torque requests of such secondary engine systems. Accordingly, conventional engine torque governing systems relying on air control systems can lack the ability to precisely control torque production, which can lead to decreased engine performance and safety.

SUMMARY

The subject matter of the present application has been developed in response to the present state of the art, and in particular, in response to the problems and needs in the internal combustion engine art that have not yet been fully solved by currently available engine systems. Accordingly, the subject matter of the present application has been developed to provide an engine management system that utilizes slow response actuators and fast response actuators to manage the torque produced by the engine.

The present disclosure relates to a system for managing engine output that includes a machine manager module and a combustion module. In one embodiment, the combustion module includes a slow response pathway and a fast response pathway. The slow response pathway includes managing air and fuel actuators and the fast response pathway includes managing spark timing. According to one embodiment, managing spark timing comprises bringing a spark actuator to the middle of a spark timing range for bi-directional control and involves sacrificing engine efficiency for engine responsiveness. Further, the fast response pathway may be selectively enabled based upon an optimization index.

According to another embodiment of the system, requested engine output that exceeds the ability of the fast response pathway to control is considered and managed in the slow response pathway. Also, the machine manager module and the combustion module may identify and track the source of the torque requests through the arbitration pathways. The system may also correlate ultimate engine operating demands with the identification of the torque request and the specifications of a given actuator.

The present disclosure also relates to a method for managing engine output. The method includes arbitrating fast response engine output requests, arbitrating slow response engine output requests, and combining fast response engine output requests and slow response engine output requests into a common arbitration architecture. According to one embodiment, arbitrating fast response engine output requests may be selectively enabled based on an optimization index. Further, arbitrating fast response engine output may involve managing spark timing. For example, the method may include bringing a spark actuator to the middle of a spark timing range in order to enable bi-directional control, thereby sacrificing engine efficiency for engine responsiveness. Also, the method may include identifying and tracking the source of the engine output requests.

The present disclosure, according to another embodiment, also relates to a method for improving torque actuation response. The method may include actuating fuel and air actuators to achieve a built-up torque reserve and (at the same time) retarding spark timing from an optimal spark timing to achieve a desired engine output torque. For example, the method may include bringing a spark actuator to the middle of a spark timing range in order to enable bi-directional control, thereby sacrificing engine efficiency for engine responsiveness.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Figure 1:
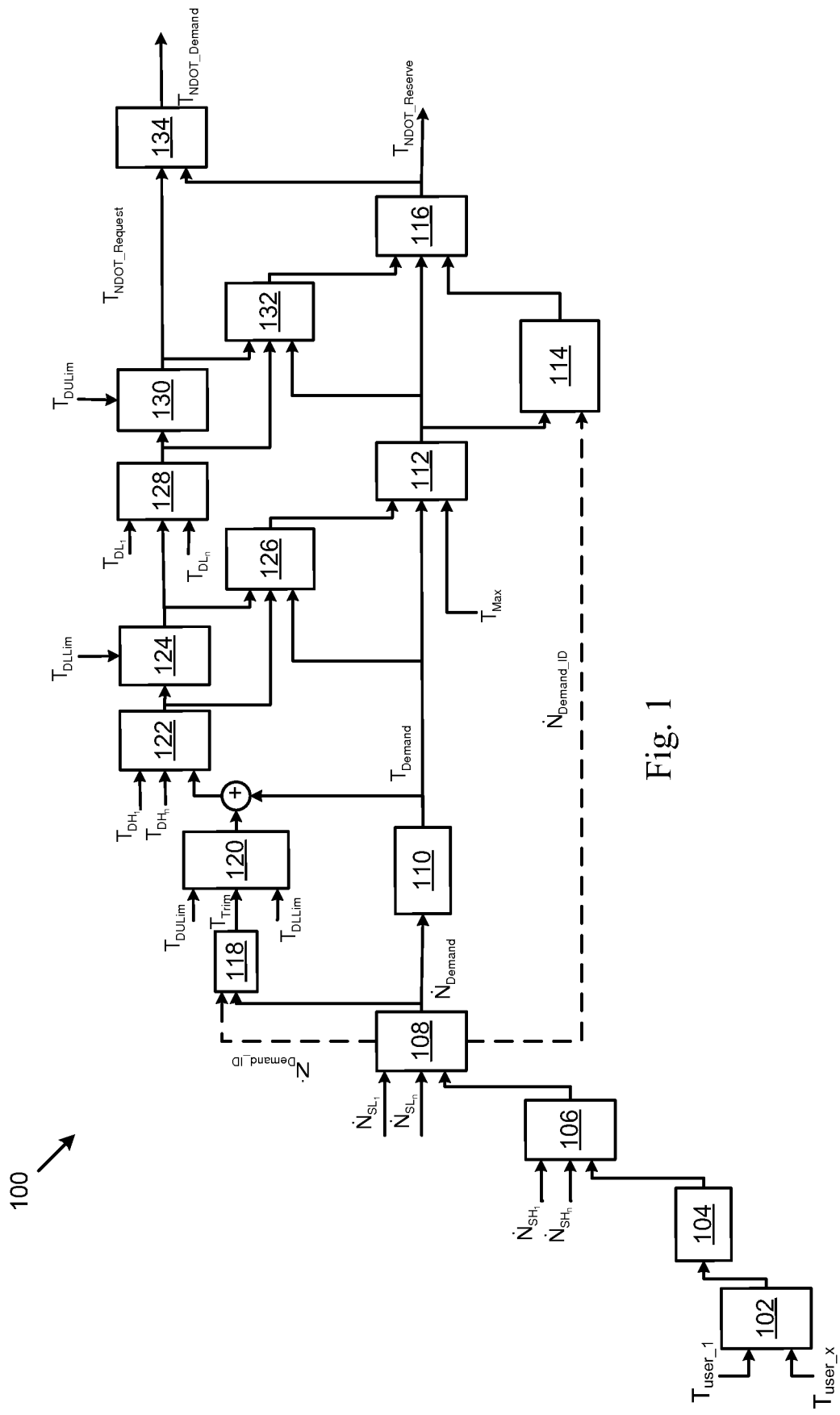
FIG. 1 is a schematic block diagram of one embodiment of a system for managing engine output.

FIG. 1 is one embodiment of an arbitration architecture 100 for controlling engine torque with more than one type of actuator. As discussed previously, conventional control systems generally include only one type of actuator, such as an air intake valve, to control the torque produced by the engine. The present disclosure, however, provides for a secondary control loop and a secondary arbitration pathway within the primary arbitration architecture that can manage torque requests that require faster response times than air intake valve actuation alone can provide. The secondary arbitration pathway manipulates a second type of actuator, which in the illustrated embodiment is the timing of the combustion spark. Throughout the present disclosure, the terms "slow response path" and/or "air actuation" will be used in reference to the primary control loop and primary arbitration pathway and the terms "fast response path" and/or "spark actuation" will be used in reference to the secondary control loop and secondary arbitration pathway.

The initial three "MIN/MAX" arbitration modules in FIG. 1 are commonly used in existing acceleration (e.g., $\dot{N}$ (i.e., NDOT) or speed rate of change) governors. The first initial arbitration module 102 selects the highest torque request from a user (driver/operator) and then converts 104 the selection to an acceleration request. This acceleration request is then passed to the second initial arbitration module 106, where it is compared with high limit acceleration requests, such as those associated with RPM redline limits and high speed governors, and the lowest acceleration request is selected. In other words, the second initial arbitration module 106 checks to make sure that the user requested torque from the first initial arbitration module 102 does not exceed any of the engine's high acceleration limits. The third initial arbitration module 108 compares the selection from the second initial arbitration module 106 with low limit acceleration requests, such as minimum RPM limits and minimum speed governors, for preventing engine stall. The highest of the acceleration requests arbitrated by the third initial arbitration module 108 is selected, thereby ensuring that the user requested torque from the first initial arbitration module 102 does not fall below any of the engine's low acceleration limits.

The "winning" acceleration request ($\dot{N}_{Demand}$) that results from the initial three arbitration modules 102, 106, 108 is the acceleration set point or the acceleration demand that is to be asked of, or placed on, the engine. Generally, conventional air actuation control loops would then intervene and determine the proper air intake valve position for altering the combustion process to control the torque produced by the engine according to the winning acceleration demand. However, the present disclosure provides for two control loops and two arbitration pathways to analyze the acceleration demand in view of torque limiting requests to more precisely control the engine's torque production.

FIG. 1 depicts a two-pathway arbitration architecture, including both an upper pathway and a lower pathway, for satisfying multiple torque requests from multiple requestors with varying optimization requirements. The upper arbitration pathway is a selectively enabled fast response path that controls torque with spark timing and the lower arbitration pathway is a slow response path that controls torque with combustion air. In one embodiment, activation of the selectively enabled fast response path is based on an optimization index or designation specifying the relative importance of engine efficiency versus improved torque response. This trade-off between engine efficiency and torque response will be described in greater detail below with reference to the reserve torque manager 114. In another embodiment, the fast response path is selectively enabled by a user or is enabled when certain user designated conditions are satisfied. It is contemplated that other means of selectively enabling the fast response pathway would be recognized by those of ordinary level of skill in the art and would fall within the scope of the present disclosure.

The slow response path (lower pathway) first involves a control loop 110, such as a proportional-integral control loop or a proportional-integral-derivative control loop, tuned for air actuation dynamics, which takes the acceleration demand and converts it to an air actuated torque demand ($T_{Demand}$). This air actuated torque demand from the primary pathway will be used in various air actuation path arbitrations, as discussed below in relation to the air actuation pathway.

The fast response path (upper pathway in FIG. 1) first uses a fast-acting control loop 118, such as a proportional control loop or a proportional-derivative control loop which is tuned for spark actuation dynamics, to convert the acceleration demand into a spark-actuated torque demand ($T_{Trim}$). This spark-actuated torque demand is passed into a limiter 120 to ensure that the spark-actuated torque being requested by the user can be achieved by spark timing actuation. In other words, the spark-actuated torque demand $T_{Trim}$ is compared to upper and lower dynamic limits $T_{DULim}$, $T_{DLLim}$, respectively, to confirm that, according to the then-existing conditions of the engine, the requested torque associated with the torque demand $T_{Trim}$ is achievable. For example, if the requested torque is too high, the limiter 120 will restrict the requested torque at the dynamic upper limit and vice versa for torque requests that are too low.

A resultant/absolute torque request or demand equal to the limited spark-actuated torque demand $T_{trim}$ from the limiter 120 plus the air actuated torque demand $T_{Demand}$ from the governer 110, along with fast torque high limit requests from secondary systems, such as traction control systems, anti-lock braking systems, shift-torque management systems and the like, are then passed to a first "MIN" arbitration module 122. This first "MIN" arbitration module 122 ensures that the absolute torque demand requested by a user does not exceed any limits placed on the engine from other systems. However, if the absolute torque demand is higher than at least one of the high limit requests from secondary systems, the first "MIN" arbitration module 122 will select the lowest value to pass on to the next step in the pathway.

The selected torque from the first "MIN" arbitration 122 is compared to the dynamic lower limit of the spark actuator at a first "MAX" arbitration module 124 to ensure that the requested torque is achievable under the then-existing conditions of the engine. Any residual torque that is not achievable by the fast spark actuator is then added back into the primary air actuated pathway, which is depicted in FIG. 1 by the first summation block 126.

The resultant torque request from the first two arbitrations modules 122, 124 of the fast path along with fast torque low limit requests from secondary systems, such as AC clutch systems and the like, are then passed to a second "MAX" arbitration module 128. This arbitration module 128 ensures that the spark actuated demand does not fall below any lower limits placed on the engine from other systems. However, if the spark actuated demand request is lower than at least one of the low limit requests from secondary systems, this "MAX" arbitration module 128 will select the highest value to pass on to the next step in the pathway.

The selected torque from the "MAX" arbitration module 128 is compared to the dynamic upper limit of the spark actuator by a second "MIN" arbitration module 130 to ensure that the requested torque $T_{NDOT\_Request}$ is achievable under the then-existing conditions of the engine. Any residual torque that is not achievable by the fast spark actuator is then added back into the primary air actuated pathway, which is depicted in FIG. 1 by the second summation block 132. Any torque that is achievable by the fast spark actuator is passed on to the "MIN" arbitration module 134 that compares the torque request $T_{NDOT\_Request}$ achievable by the fast spark actuator and the slow path torque request $T_{NDOT\_Reserve}$. The "MIN" arbitration module 134 selects the lower of the resultant spark-actuated and air-actuated torque requests, and sends the selected lower torque request $T_{NDOT\_Demand}$ to the engine to control torque generated by the engine. The slow path torque request $T_{NDOT\_Reserve}$ effectively drives the amount of air and fuel to be combusted to achieve the desired torque. The difference between the $T_{NDOT\_Reserve}$ and $T_{NDOT\_Demand}$ effectively drives the spark timing changes for fast torque modulation needs.

Returning to the primary pathway, the air actuated torque demand may be increased or decreased depending on the results of the fast path arbitration modules. As mentioned previously, residual torque from the fast path that exceeds the dynamic upper and lower limits of the spark actuator may be added into the slow path. This is depicted in FIG. 1 by the "MIN" and "MAX" arbitration modules 112, 116 in the slow pathway. The first "MIN" arbitration module 112 in the slow path ensures that the requested residual torque, if any, from the fast path does not exceed the maximum torque possible. In FIG. 1, after the residual torque, if any, is added into the slow path, the slow path torque ($T_{NDOT\_Reserve}$) functions as the predicted, long term torque request that will need to be met by the air actuator.

The present disclosure also provides for a reserve torque manager 114 which biases the torque reserve by bringing the spark actuator to the middle of its range, thereby allowing bi-directional control. Spark ignited engines have an optimal spark timing that, when followed, maximizes the efficiency of the engine by producing the highest possible torque. The reserve torque manager 114 of the present disclosure performs spark retard, which modifies the spark timing away from optimal spark timing, thereby enabling the spark actuator to be able to increase or decrease (depending on the fast path torque demand) the torque produced by the engine. However, since the improved response of the spark actuator requires the engine to run at non-optimal spark timing, engine efficiency is sacrificed.

Figure 2:
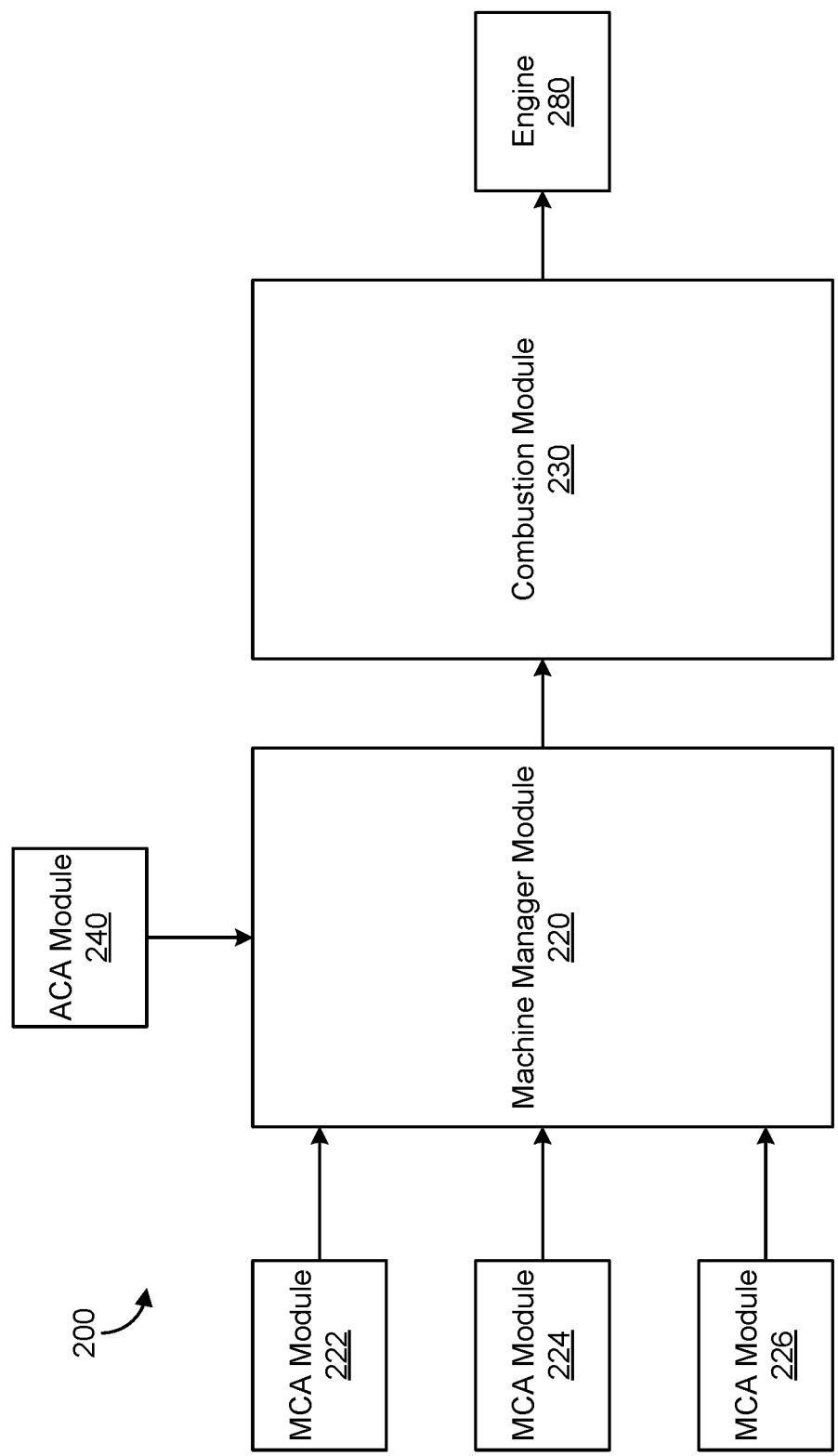
FIG. 2 is a schematic block diagram of another embodiment of a system for managing engine output, the system including a machine manager module and a combustion module.
Figure 3:
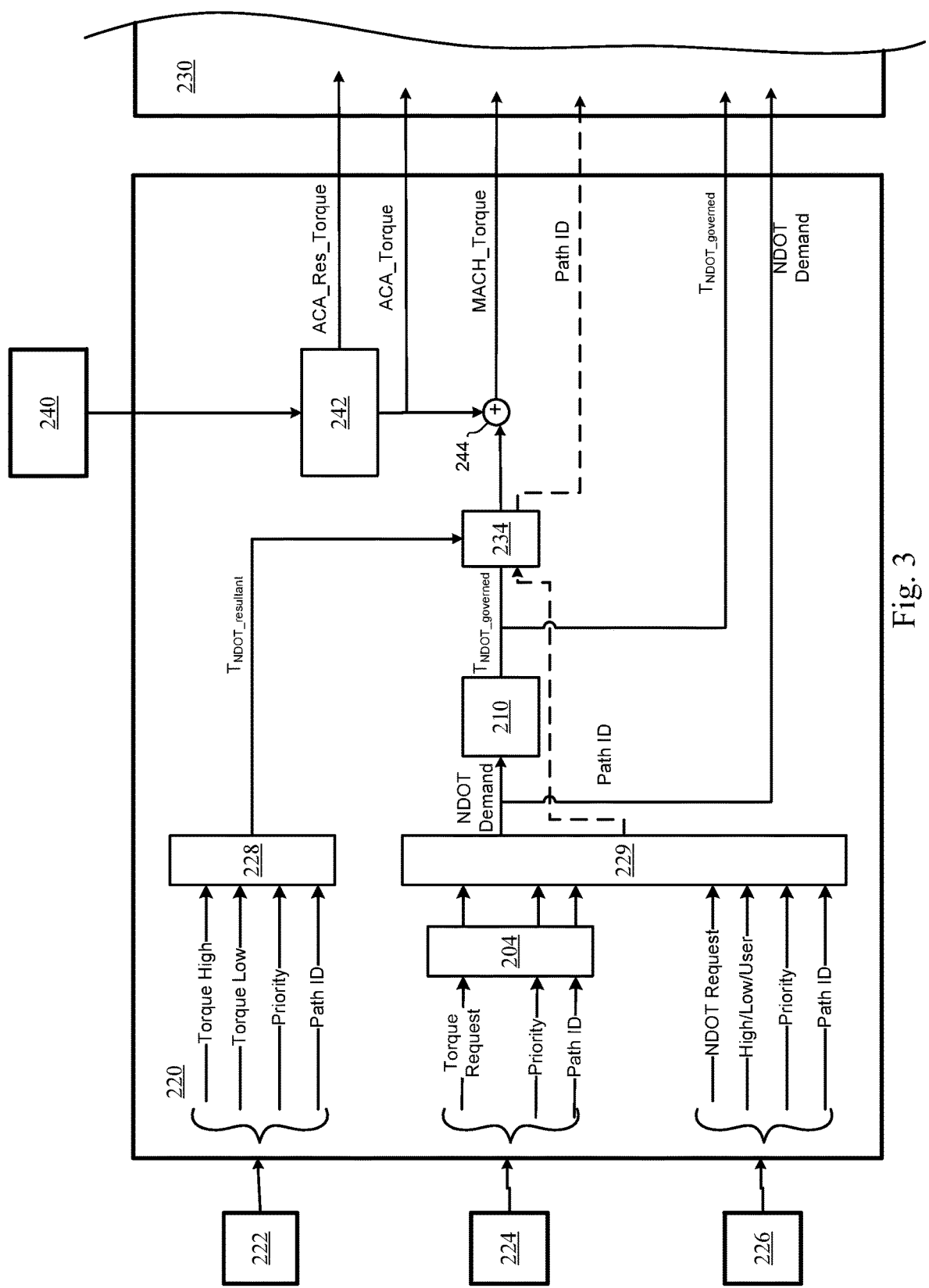
FIG. 3 is a schematic block diagram of one embodiment of the machine manager module of FIG. 2.
Figure 4:
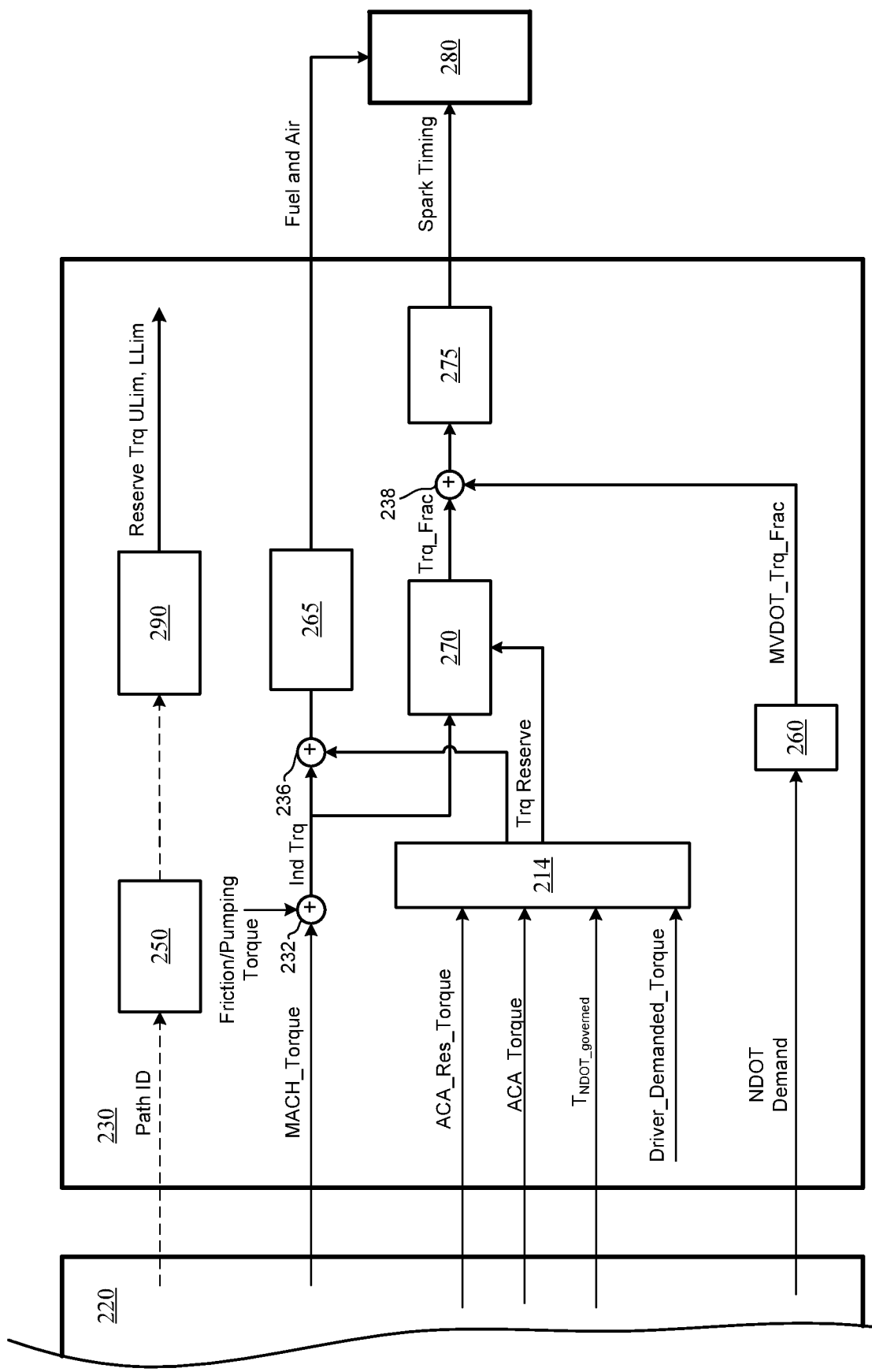
FIG. 4 is a schematic block diagram of one embodiment of the combustion module of FIG. 2.

According to yet another embodiment depicted in FIGS. 2-4, an arbitration architecture or control system 200 shares some of the same or similar features of the architecture 100 of FIG. 1. However, the architecture 200 also includes several differences compared to the architecture 100. Referring to FIG. 2, the arbitration architecture 200 includes a machine manager module ("MACH") 220 and a combustion module ("CBM") 230. Generally, the machine manager module 220 receives torque and acceleration inputs from a user and/or system of a vehicle (elements 222, 224, 226, and 240) depicted in FIG. 2) and generates torque requests that the combustion module uses to issue fuel, air, and spark timing commands for an engine 280.

FIG. 3 is a schematic block diagram of one embodiment of the machine manager module 220. More specifically, the machine manger 220 includes a plurality of machine control agent (MCA) modules 222, 224, 226. The MCA module 222 manages high and low torque requests from auxiliary systems of a vehicle, and transmits the high and low torque requests, along with an auxiliary torque request prioritization scheme (priority) and the identification of the systems making the requests (Path ID), to a first arbitration module 228. Each torque request from a particular auxiliary system is assigned a particular Path ID associated with that auxiliary system. Accordingly, as defined herein, as a torque request from a source (e.g., auxiliary system, user, or otherwise) passes through the arbitration process, the Path ID identifying the source of the torque request passes through along with the request. The first arbitration module 228 arbitrates the torque request data receives by the MCA module 222 and therefrom determines a resultant or winning torque request ($T_{NDOT\_resultant}$) by comparing the high and low torque requests to lower and upper limits in a manner at least similar to that described above in association with architecture 100. Further, the resultant torque request $T_{NDOT\_request}$ is determined based on the torque request prioritization scheme and the Path ID of the requests. The winning torque request $T_{NDOT\_resultant}$ and its associated Path ID are then communicated to a limiting module 234 as will be explained in more detail below.

The MCA module 224 manages torque requests from a user (e.g., driver) of the vehicle or engine 280. The torque requests may come from a user-actuated accelerator pedal of the vehicle or other sources as discussed above. The MCA module 224 also includes a user-generated torque request prioritization scheme and tracks the identification of the sources of the torque requests (Path ID). The user-generated torque requests are converted to a change in speed value ($N_{DOT}$) by a torque conversion module 204. The MCA module 224 and torque conversion module 204 forwards the prioritization scheme and Path ID information associated with the user-generated torque requests to a second arbitration module 229.

The MCA module 226 manages acceleration requests (NDOT Request) from various sources. The acceleration requests are associated with upper and lower engine speed limits (Hi/Low) and user-defined speed limits (User). The MCA module 226 also includes an acceleration request prioritization scheme and tracks the identification of the sources of the acceleration requests. The MCA module 226 also forwards the acceleration requests, prioritization scheme, and Path IDs associated with the acceleration requests to the second arbitration module 229.

The second arbitration module 229 arbitrates the user-generated torque request and acceleration request information from the MCA modules 224, 226, respectively, to generate a winning acceleration demand value (NDOT_Demand) and its associated Path ID. The winning acceleration demand value is processed by an acceleration (NDOT) governor 210 similar to the governor 110 of the architecture or control system 100. Based on fuel consumption, efficiency, and reserve path dynamics parameters, the governor 210 generates a winning governed torque request ($T_{NDOT\_governed}$). The Path ID associated with the winning acceleration demand value is forwarded on to a torque reserve mapping module 214 as will be described in more detail below.

The machine manager module 220 includes a limiting module 234 that receives the winning or resultant torque request $T_{NDOT\_resultant}$ (and its associated Path ID) from the first arbitration module 228 and the winning governed torque request $T_{NDOT\_governed}$ (and its associated Path ID) from the governor 210. The limiting module 234 compares the resultant torque request $T_{NDOT\_resultant}$ and governed torque request $T_{NDOT\_governed}$ and forwards the lower of the two requests to the summation module 244. Additionally, the limiting module 234 forwards the Path ID associated with the lower of the two requests to a combustion authority index (CAI) mapping module 250 for further processing.

The system 200 also includes an accessory control agent (ACA) module 240 that manages (e.g., receives) torque requests from on-board vehicle accessories (e.g., AC compressor, alternator, etc.). The several torque requests managed by the ACA module 240 are added together by a summation module 242 to create a total ACA torque request (ACA_Torque). The total ACA torque request is received by the summation module 244, which adds the total ACA torque request to the lower request of the resultant torque request $T_{NDOT\_resultant}$ and governed torque request $T_{NDOT\_governed}$ received from the limiting module 234 to create a total torque request (MACH Torque). The total torque request is sent to the combustion module 230 for further processing. The summation module 242 also determines an ACA torque reserve request (ACA_Res_Trq) for anticipated future torque needs from on-board vehicle accessories. Both the ACA torque reserve request and total ACA torque request are communicated to the combustion module 230 for future processing.

FIG. 4 is a schematic block diagram of one embodiment of the combustion module 230. The combustion module 230 includes the combustion authority index (CAI) mapping module 250 and the torque reserve mapping module 214. The CAI mapping module 250 receives the final path ID of the lowest torque request outputted from the limiting module 234 and prioritizes the path ID into a CAI based on predetermined or precalibrated maps stored in the CAI mapping module. The CAI issued by the CAI mapping module 250 is utilized by an authority limits module 290 that stores information concerning relationships between limits of the various torque actuators or levers (e.g., air intake throttle, spark timing, etc.) and the final path ID. Based on the stored information, the authority limits module 290 generates upper and lower authority limits (Reserve Trq ULim, LLim) for the various torque actuators that may be actuated to achieve the reserve torque. For example, the authority to adjust (e.g., the adjustability range of) the air intake throttle or spark timing may be different for different path IDs (e.g., different sources of torque requests). Accordingly, the authority limits module 290, based on input from the CAI mapping module 250, sets the actuation limits as a function of the final path ID.

The torque reserve mapping module 214 generates a reserve torque request value (Trq Reserve) representing anticipated future or supplemental torque demands from on-board vehicle systems. The reserve torque request value is generated by the mapping module 214 according to one of several methodologies or approaches executed by a torque reserve calculation module 216 that forms part of the torque reserve mapping module 214. Each methodology is based on at least one of several inputs received by the torque reserve mapping module 214. More specifically, as shown in FIGS. 2 and 3, the torque reserve mapping module 214 receives as inputs the torque demand requested by the driver of the vehicle (Driver_Demand_Torque (DDT)), the winning governed torque request $T_{NDOT\_governed}$ (NDT), the total ACA torque request ACA_Torque, the ACA torque reserve request ACA_Res_Trq (which can be added to or used as a minimum limit for the reserve torque request value issued by the torque reserve mapping module 214), and the upper and lower authority limits from the authority limits module 290.

Referring to FIG. 3, according to a first approach executable by the torque reserve calculation module 216, the torque reserve value Trq Reserve is set equal to the winning governed torque request $T_{NDOT\_governed}$ (NDT) less the total torque request MACH_Torque. According to a second approach, the torque reserve value Trq Reserve is set equal to a predetermined or calibrated percentage C_TrqResPct (PathID) multiplied by the total torque request MACH_Torque. The calibrated percentage C_TrqResPct(PathID) is determined based on the winning Path ID or torque request source. Generally, the calibrated percentage will be lower if less reserve torque is necessary, and vice versa. For example, if the winning torque request source is a source requiring a high speed torque response time or a fast actuator, the calibrated percentage may be higher (e.g., 30%) than if the winning torque request source requires only slow speed torque response times or a slow actuator (e.g., 10%). In yet a third approach, the torque reserve value Trq Reserve is set equal to a predetermined or calibrated torque reserve value C_TrqRes(PathID) based on the winning Path ID or torque request source. In a fourth approach, the torque reserve value Trq Reserve is set equal to the torque demand requested by the driver of the vehicle DDT less the total torque request MACH_Torque. Which approach is used by the torque reserve mapping module 214 is based on any of various factors, such as the winning Path ID (e.g., winning torque request source), operating state of the engine, physical condition of the engine, etc. For example, If the actuator reserve limits provided by 290 are such that lean operation is allowed, the reserve torque manager may decide not to utilize reserve from spark retard in favor of fuel reserve. In this case, no additional reserve is requested to 270 or the summing junction 236. This provides a more efficient method of reserve torque by avoiding spark retard.

Referring now to FIG. 4, the combustion module 230 includes a summation module 232 that adds together the total torque request MACH_Torque and a losses torque representing the torque necessary to compensate for friction and pumping torque losses inherent in an engine system. This compensated or supplemented total torque request (i.e., indicated torque (IndTrq)) is added to the reserve torque value Trq Reserve generated by the torque reserve mapping module 214 at another summation module 236. This ultimate torque request is converted to fuel and air commands by a torque to air/fuel converter module 265. The fuel and air commands are then communicated to fuel and air actuators of the engine 280, which actuate according to the commands to produce a torque corresponding with the ultimate torque request.

The reserve torque value (Trq Reserve) also is communicated to a torque fraction module 270. The torque fraction module 270 computes a torque fraction (Trq_frac) equal to the indicated torque (IndTrq) divided by the sum of the indicated torque (IndTrq) and the reserve torque value (Trq Reserve). The torque fraction (Trq_frac) is used by the spark efficiency map 275 to determine how much spark retard is needed to offset the TrqReserve and deliver the desired torque.

The combustion module 230 also includes a multi-variable speed (MVNDOT) governor 260 similar to the speed governor 110, 118, or 210. The MVNDOT governor 260 is tuned for spark actuation dynamics. As shown, the MVNDOT governor 260 generates a governed torque fraction (MVDOT_Trq_frac) generated based on spark actuation dynamics. The spark-adjusted governed torque fraction (MVDOT_Trq_frac) is then added to the torque fraction (Trq_frac) by a summation module 238. The combined spark-adjusted governed torque fraction (MVDOT_Trq_frac) and torque fraction (Trq_frac) is inputted to a spark efficiency map 275 that creates a spark timing command communicated to spark timing actuators of the engine 280. The spark timing actuators actuate according to the spark timing command. Generally, spark actuation is used in concert with the commanded fuel and air mixture from the air/fuel converter module 265 to effectively achieve the indicated torque (IndTrq). More specifically, the spark timing command retards the spark to effectively offset the extra fuel and air required to build up the actual reserve torque.

Reference throughout this specification to "one embodiment," "an embodiment," or similar language means that a particular feature, structure, or characteristic described in connection with the embodiment is included in at least one embodiment of the subject matter of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the subject matter of the present disclosure, however, absent an express correlation to indicate otherwise, an implementation may be associated with one or more embodiments.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The subject matter of the present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for managing engine output, comprising:
   a machine manager module programmed to receive at least one of a torque input and an acceleration input and, in response, generate a torque request for an engine;
   a combustion module coupled to the machine manager module and programmed to receive the torque request, the combustion module comprising:
      a slow response control pathway that at least partially controls torque of the engine based on the torque request, and
      a fast response control pathway that at least partially controls torque of the engine based on the torque request, the fast response control pathway programmed to:
         determine an amount of the torque request that can be provided by the fast response pathway based on a governed torque fraction value and a torque fraction value, the governed torque fraction value based on information indicative of existing operating conditions of the spark timing actuator of the engine, and the torque fraction value indicative of a total torque request value and an anticipated future torque demand value, and
         manage a spark timing actuator of an engine to produce the amount of torque that can be provided by the fast response pathway; and
   an arbitration module structured to determine a remaining amount of the torque request that cannot be provided by the fast response control pathway based on an existing operating condition of the engine, and to command the slow response control pathway to provide the remaining amount of the torque request.

2. The system of claim 1, wherein the slow response control pathway comprises managing air actuators.

3. The system of claim 1, wherein the fast response control pathway comprises managing fuel injection to affect a change in engine output from one combustion event to the next.

4. The system of claim 1, wherein managing spark timing comprises spark retardation.

5. The system of claim 4, wherein the spark retardation sacrifices engine efficiency for engine responsiveness.

6. The system of claim 1, wherein the fast response control pathway is selectively enabled based on an optimization index.

7. The system of claim 1, wherein the combustion module identifies and tracks a source of torque requests through arbitration pathways.

8. The system of claim 7, wherein the combustion module correlates ultimate engine operating demands with the identification of the torque request and the specifications of a given actuator.

9. A system for managing engine output, comprising:
   a machine manager module programmed to receive at least one of a torque input and an acceleration input and, in response, generate a torque request; and
   a combustion module communicably coupled to the machine manager module and programmed to receive the torque request and manage engine torque output based on the torque request, the combustion module comprising:

a slow response pathway module programmed to manage air actuators based on the torque request; and a fast response pathway module programmed to manage at least one of a spark timing actuator and a fuel injection event to affect a change in engine torque output from one combustion event to the next based on the torque request, wherein the fast response pathway module is programmed to:

determine an amount of the torque request that can be provided by the spark timing actuator based on a governed torque fraction value and a torque fraction value, the governed torque fraction value based on information indicative of existing operating conditions of the spark timing actuator of the engine, and the torque fraction value indicative of a total torque request value and an anticipated future torque demand value, and manage the spark timing actuator of the engine to produce the amount of torque that can be provided by the spark timing actuator; and an arbitration module structured to determine a remaining amount of the torque request that cannot be provided by the fast response control pathway based on an existing operating condition of the spark timing actuator of the engine, and to command the slow response control pathway to provide the remaining amount of the torque request.

10. The system of claim 9, wherein managing spark timing comprises spark retardation.

11. The system of claim 10, wherein the spark retardation sacrifices engine efficiency for engine responsiveness.

12. The system of claim 9, wherein the combustion module is programmed to selectively enable the fast response pathway module based on an optimization index.

13. The system of claim 9, wherein the machine manager module is programmed to identify and track a source of the torque request.

14. The system of claim 13, wherein the combustion module is programmed to correlate ultimate engine operating demands with the identification of the torque request and the specifications of a given actuator.

15. The system of claim 1, wherein the torque fraction value is determined based on an indicated torque value, indicative of the total torque request and a losses torque, divided by the sum of the indicated torque value and a reserve torque value indicative of the anticipated future torque demand value.

16. The system of claim 9, wherein the torque fraction value is determined based on an indicated torque value, indicative of the total torque request and a losses torque, divided by the sum of the indicated torque value and a reserve torque value indicative of the anticipated future torque demand value.

* * * * *